US006946612B2

(12) United States Patent
Morikawa

(10) Patent No.: US 6,946,612 B2
(45) Date of Patent: Sep. 20, 2005

(54) MAIL SEQUENCING SYSTEM

(75) Inventor: Hajime Morikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 194 days.

(21) Appl. No.: 10/351,319

(22) Filed: Jan. 27, 2003

(65) Prior Publication Data

US 2003/0141226 A1 Jul. 31, 2003

(30) Foreign Application Priority Data

Jan. 28, 2002 (JP) ....................................... 2002-018490

(51) Int. Cl.[7] .............................. B07C 6/01; G06K 9/01

(52) U.S. Cl. ....................... 209/584; 209/900; 700/228; 700/225

(58) Field of Search ................................. 209/584, 900; 700/219–221, 223–226, 228, 230; 414/928, 929

(56) References Cited

U.S. PATENT DOCUMENTS 4,468,165 A * 8/1984 Kawasaki ................... 414/403
5,993,132 A * 11/1999 Harres et al. .......... 414/416.04
6,390,756 B1 * 5/2002 Isaacs et al. ................ 414/281

FOREIGN PATENT DOCUMENTS

JP 59-90679 A 5/1984

* cited by examiner

*Primary Examiner*—Donald R. Walsh
*Assistant Examiner*—Jonathan R. Miller
(74) *Attorney, Agent, or Firm*—Sughrue Mion, PLLC

(57) ABSTRACT

A mail sequencing system has, its top surface part, a tray storage. A non-standard-size mail supplied from a mail supplying unit is read by a bar code reader. The mail is stacked in a predetermined sorting bin based on the information. A tray onto which the mail is stacked is carried sequentially from the sorting bin to the tray storage and is supplied via a spiral chute to the mail supplying unit again to perform the second sorting. The destination of the mail can be automatically further sorted.

20 Claims, 12 Drawing Sheets

MAIL SEQUENCING SYSTEM

BACKGROUND OF THE INVENTION

1. Field of the Invention

The present invention relates to a mail sequencing system. More specifically, the present invention relates to a system that automatically sorts or sequences non-standard-size type mails for each destination.

2. Description of the Related Prior Art

A prior art non-standard-size mail sequencing system discriminates between the destinations of mails from their identified address and zip code and stacks the mails onto stacking trays provided in a plurality of sorting bins. The destinations are limited by the number of the sorting bins. A full tray is discharged automatically to the outside of the sorting bins to be carried by a conveyer. In the sorting bins from which the full tray is discharged, a lamp is lit up, and then, the operator supplies an empty tray. An example of such system is disclosed in Japanese Patent Application Laid-Open No. 59-090679. The system disclosed by the publication has a plurality of induction lines. In each of the induction lines, mails are separated one by one. A scanner captures the image of the mail. A synchronization carrying mechanism operated in synchronization with movement of a carrying box puts the mail into the carrying box. The carrying box including the mail is moved to a desired sorting bins identified by an image process. A controller is driven for unhooking the carrying box to open its bottom plate. The mail is dropped into a stacking box. The sequencing system processes non-standard-size mails having a length of about 40 cm and typically has at most about 300 to 400 sorting bins. In this case, even when the sorting bins are set in two upper and lower layers, the system length reaches 40 to 50 m. It is thus difficult to increase the number of the sorting bins stacking the mails so as to further sort the destinations of the mails in delivery order.

In a standard-size mail sequencing system, typically, the operator manually re-supplies once-sorted mails to a feeder mechanism for sorting twice. The mails can be further sorted. A system having 33 sorting bins performs sorting twice so as to sort delivery points of 33×33=1089. In this case, standard-size mails are sorted. The operator can manually process the mails stacked in the sorting bin. The operator can carry the mails relatively easily from the sorting bin to the feeder. The prior art non-standard-size mail sequencing system cannot easily perform sorting twice as described above. Non-standard-size mails are processed. The weight of the mails stacked onto one tray is significantly large. It is difficult for the operator to manually perform the operation. The sequencing system has to be larger.

SUMMARY OF THE INVENTION

An object of the present invention is to provide a sequencing system which can automatically further sort non-standard-size mails or flat mails and has a small occupied area.

The mail sequencing system of the present invention has a mail supplying unit reading information given to mails to supply the mails one by one; a sorting stacking unit having a plurality of sorting bins and stacking the mail onto a tray provided in each of the sorting bins; a mail carrying unit carrying the mail to the corresponding sorting bin based on the read information; a tray storage arranged on the top surface part of the mail sequencing system storing the tray; a first tray carrying unit carrying the tray from the sorting stacking unit to the tray storage; a first tray moving unit moving the tray from the sorting bin to the first tray carrying unit; a second tray carrying unit carrying the tray from the tray storage to the mail supplying unit; an empty tray supplying unit supplying an empty tray to the sorting stacking unit; a tray collecting unit collecting the tray; and a control part controlling carriage of the mail and the tray.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

A specific example of mail sequencing systems of the present invention will be described below.

Figure 1:
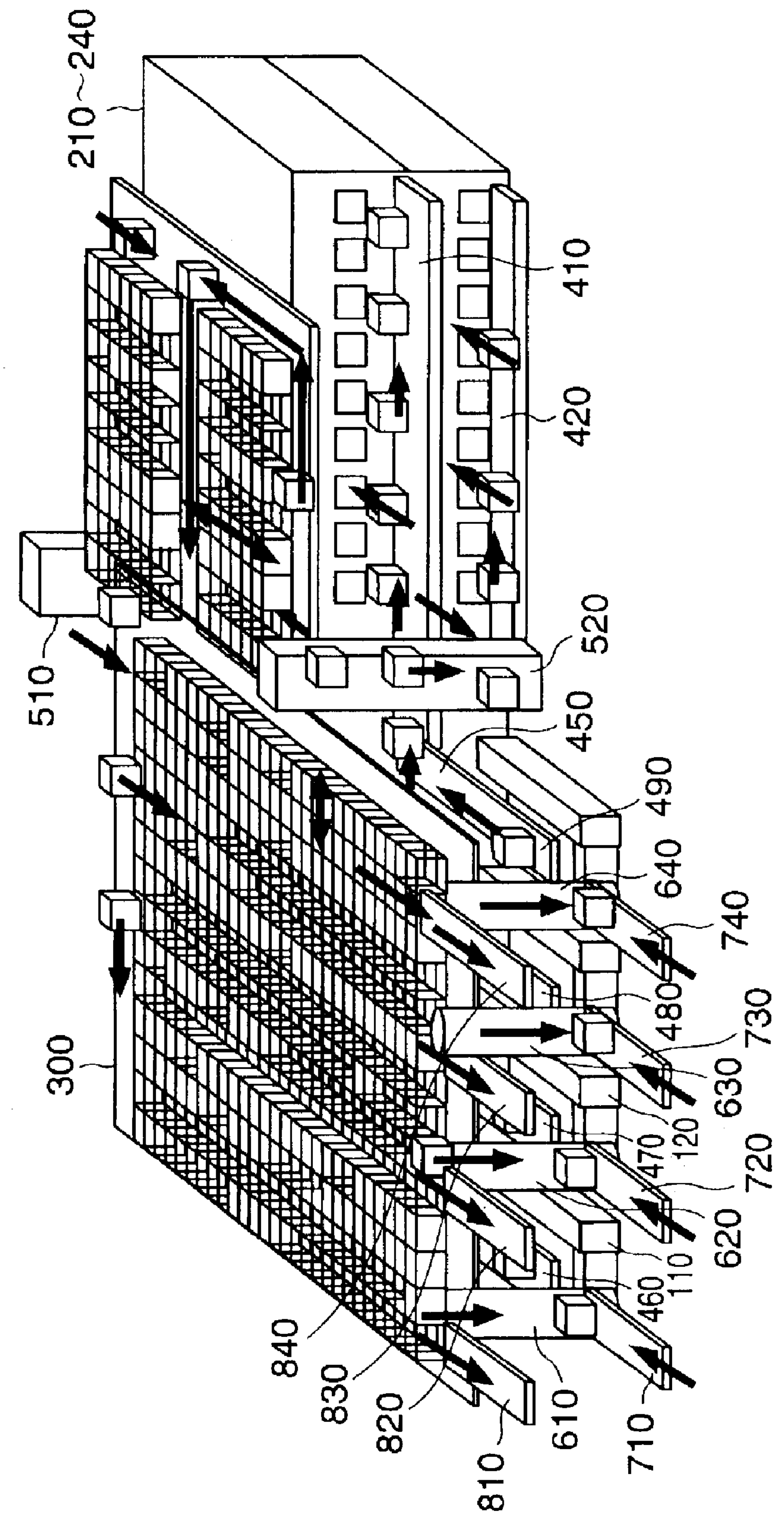
FIG. 1 is a perspective view of a specific example of mail sequencing systems of the present invention.

Referring to FIG. 1, in the specific example of the mail sequencing systems, four mail supplying units 110, 120, 130 and 140 are arrayed. Near the mail supplying units, are arranged empty tray collecting units 460, 470, 480 and 490, second tray carrying units 610, 620, 630 and 640, and tray carrying-in units 710, 720, 730 and 740 carrying-in an unprocessed tray. The mail supplying units are connected to mail carrying units (not shown) carrying a mail. The mail sequencing systems have sorting stacking units 210, 220, 230 and 240 corresponding to the mail supplying units. The sorting stacking units have first empty tray carrying units 410, 420, 430 and 440 carrying an empty tray to a sorting bin (The empty tray carrying units 430 and 440 are not shown.). The mail sequencing systems have tray vertical direction carrying parts 510 and 520 arranged adjacent to the sorting stacking units carrying the tray in the vertical direction, and a second empty tray carrying unit 450 carrying the empty tray from the empty tray collecting units to the first empty tray carrying units. A tray storage 300 storing the tray is provided at the top stage of the mail sequencing system. The tray storage 300 is provided with tray collecting units 810, 820, 830 and 840 corresponding to the mail supplying units, respectively.

The tray carrying-in units 710, 720, 730 and 740 carry-in a tray including unprocessed non-standard-size mails to the mail supplying units 110, 120, 130 and 140. The mail supplying units 110, 120, 130 and 140 have a feeder separating mails and mails one by one and an information reading unit reading information such as a bar code. The sorting bin in which the mails are stacked is decided based on the read information. The mails are put into a carrying box one by one to be carried to a predetermined sorting bin, which are thrown onto the tray provided in the sorting bin.

Figure 2A:
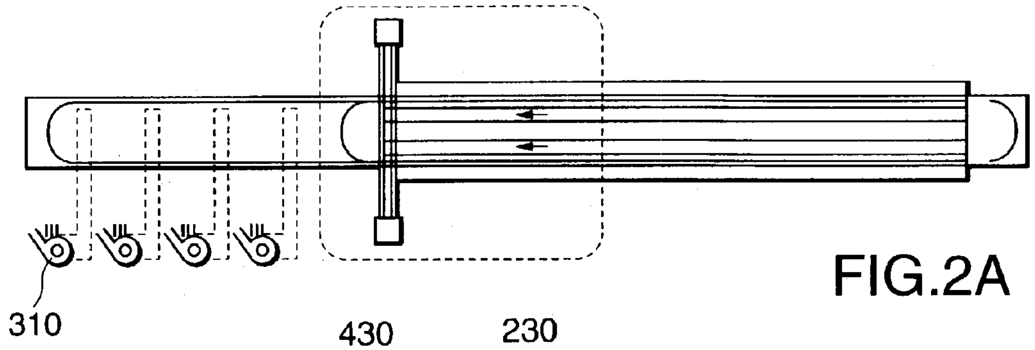
FIGS. 2A and 2B are a plan view and a partially enlarged view of a specific example of sorting stacking units.
Figure 2B:
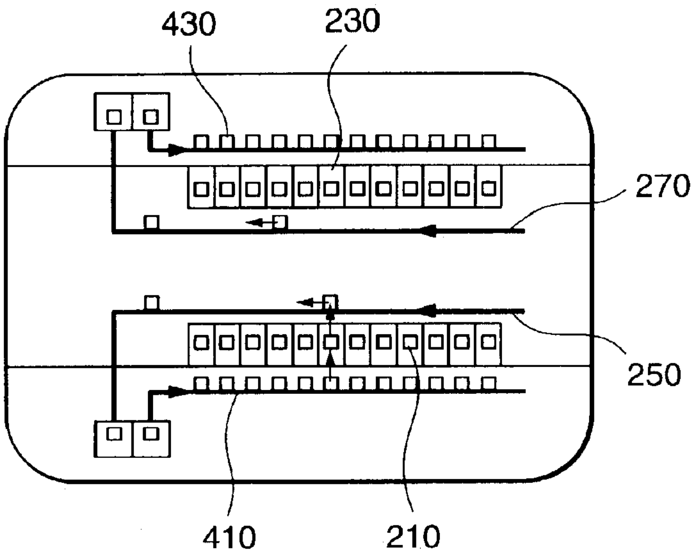

Referring to FIGS. 2A and 2B, tray moving routes in the sorting stacking units 210 and 230 are shown. In the sorting stacking unit 210, an empty tray is moved via the tray vertical direction carrying part 520 moving the tray in the vertical direction to the empty tray supplying unit 410 and is carried near a predetermined sorting bin. When the tray provided in the sorting bin is full, it is moved to a conveyer part 250 and is then carried via the tray vertical direction carrying part 520 to the tray storage 300. A first tray carrying unit includes the conveyer part 250 and the tray vertical direction carrying part 520. The empty tray is moved to the sorting bin. The tray is moved in the sorting stacking unit 230 in the same manner.

Figure 3:
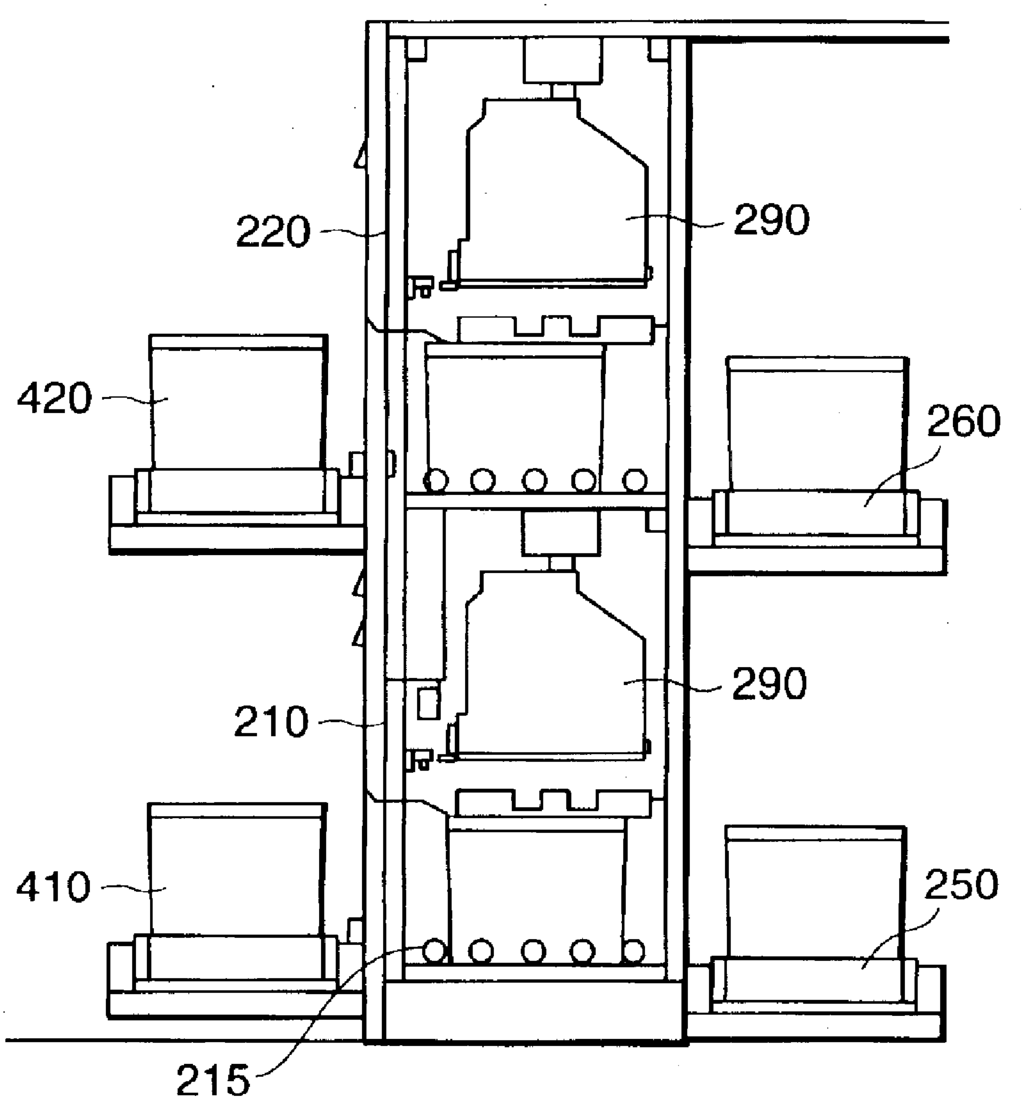
FIG. 3 is a cross-sectional view of a specific example of the sorting stacking units.

Referring to FIG. 3, the sorting stacking units 220 and 210 arranged in two stages are shown. The sorting stacking units 220 and 210 have a tray in each of the sorting bins. A carrying box 290 into which one mail is thrown by the mail supplying unit is moved in the sorting stacking units 220 and 210 and opens its bottom surface in the position of a predetermined sorting bin based on the read information to throw the mail onto the tray. The empty carrying box 290 passes on a predetermined route (not shown) to return to the mail supplying unit. The sorting stacking unit 220 has, in its side surfaces, the empty tray supplying unit 420 and a conveyer part 260 of the first tray carrying unit. The sorting stacking unit 210 has the same configuration. The full tray is moved to the conveyor parts 250 and 260 by a tray moving unit 215.

Figure 4:
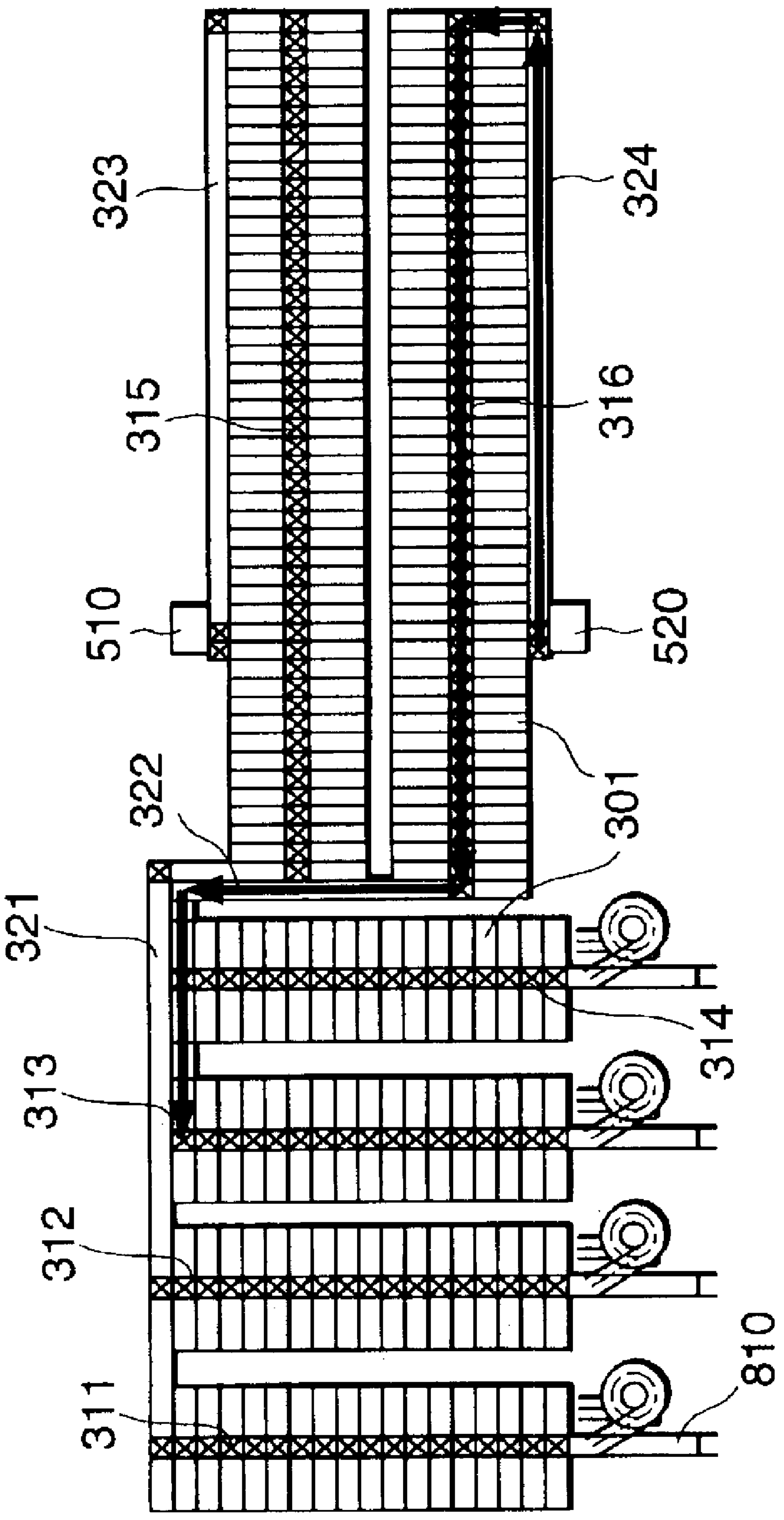
FIG. 4 is a plan view of a specific example of a tray storage.
Figure 5:
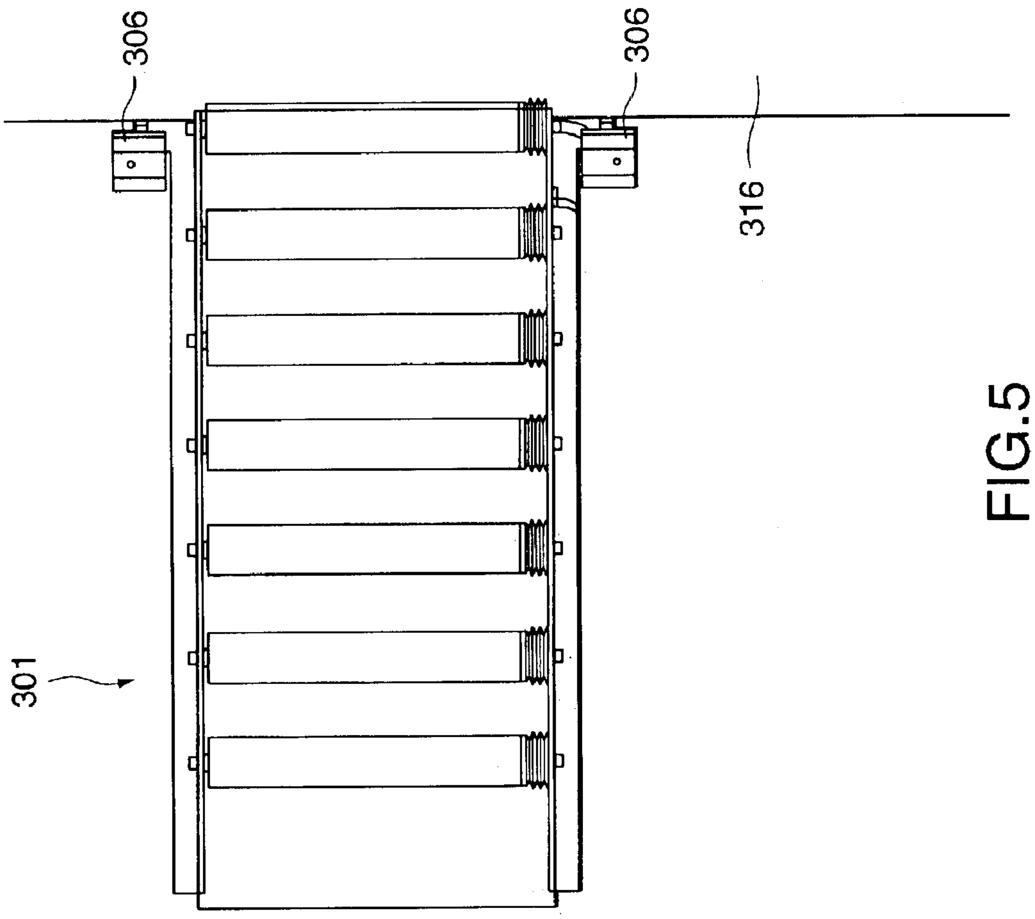
FIG. 5 is a plan view of a specific example of a storage unit.

Referring to FIG. 4, a specific example of the tray storage 300 has a plurality of center conveyers 311, 312, 313, 314, 315 and 316, and storage units 310 arranged on both sides thereof. Referring to FIG. 5, a specific example of the storage unit 310 is a roller conveyer which can house three trays. The storage unit 310 has a sensor 306 sensing moving in and out of a tray at its tray entrance. The center conveyers 311, 312, 313 and 314 are connected to the second tray carrying units 610, 620, 630 and 640, and the tray collecting units 810, 820, 830 and 840, respectively. In this example, the center conveyers 311 and 312 are connected to a side conveyer 321, and the center conveyers 313 and 314 are connected to a side conveyer 322. The independent side conveyer can be arranged for each of the center conveyers. The side conveyers 321 and 322 are connected to center conveyers 315 and 316, respectively. The center conveyers 315 and 316 are connected to side conveyers 323 and 324. The side conveyers 323 and 324 are connected to the tray vertical direction carrying parts 510 and 520, respectively. As the center conveyer and the side conveyer, a typical roller conveyer can be used. The conveyers have a direction switch switching the tray carrying direction (the location described as "X" in FIG. 4). For example, in the tray storage 300, a tray is moved from the tray vertical direction carrying part 520 to the side conveyer 324. The tray is further moved on the center conveyer 316 to the side conveyer 322. The tray can be thrown onto the center conveyer 313 or 314 by the command of the control part. The tray moved via the tray vertical direction carrying part 510 is moved on the route in almost the same manner.

Figure 6:
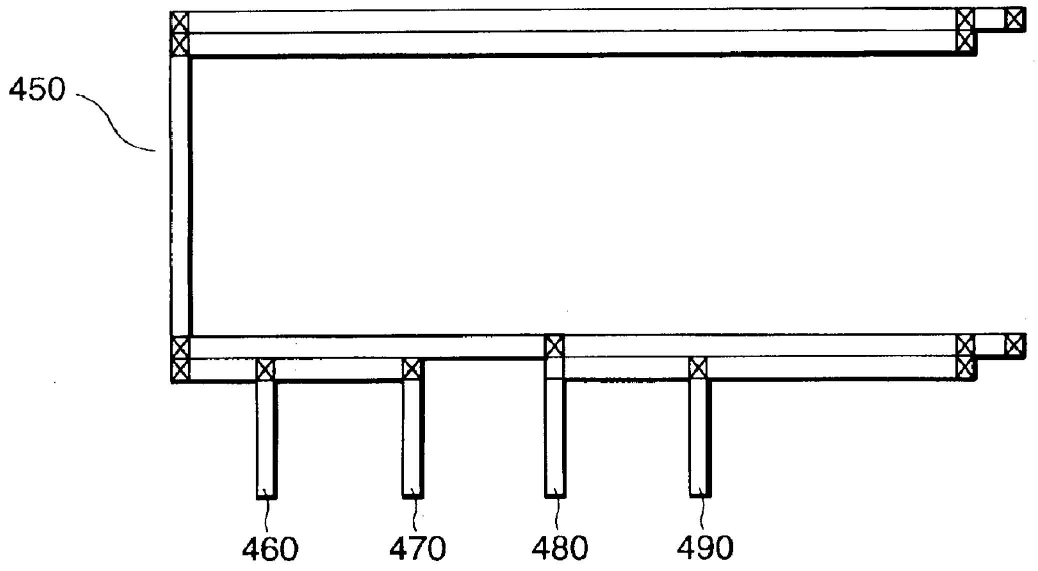
FIG. 6 is a plan view of a specific example of an empty tray supplying unit.

Referring to FIG. 6, the four empty tray collecting units 460, 470, 480 and 490 are connected to the second empty tray carrying unit 450. The second empty tray carrying unit 450 is connected to the first empty tray carrying units 410, 420, 430 and 440 via the tray vertical direction carrying parts 510 and 520. Empty trays collected by the empty tray collecting units 460, 470, 480 and 490 from the mail supplying units 110, 120, 130 and 140 are carried via the route near the sorting bin of the sorting stacking unit. When the maximum number of the empty trays are held in the first empty tray carrying units 410, 420, 430 and 440, the second empty tray carrying unit 450 can hold them temporarily. The section of part of the second empty tray carrying unit 450 is double. The second empty tray carrying unit 450 is arranged below the tray storage 300.

Figure 7C:
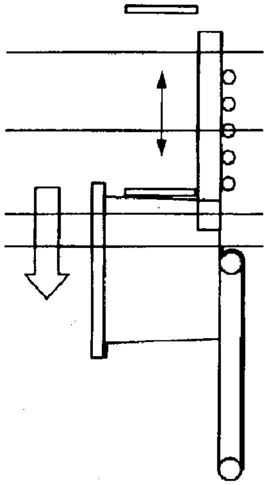
FIGS. 7A, 7B and 7C are cross-sectional views of a specific example of a first tray carrying unit.
Figure 7B:
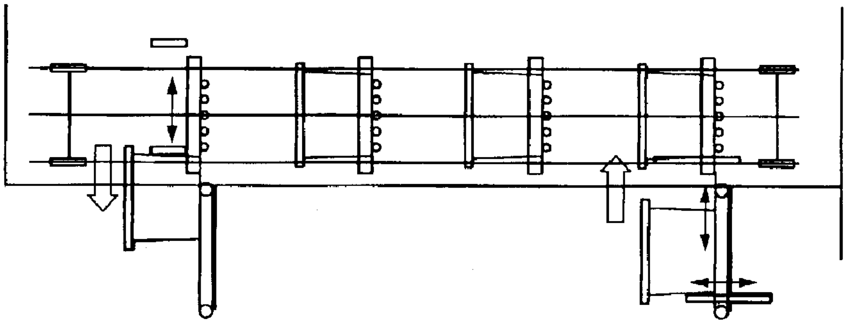
Figure 7A:
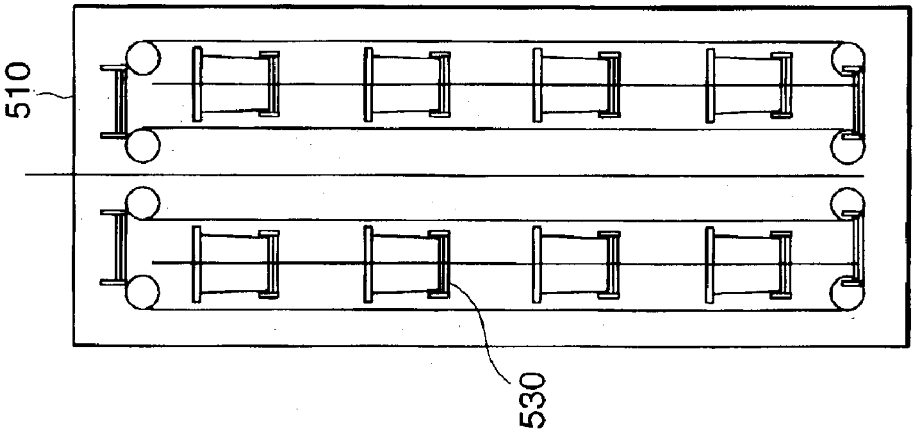

FIGS. 7A, 7B and 7C show a specific example of the tray vertical direction carrying parts 510 and 520. FIG. 7A is a front view, FIG. 7B is a side view, and FIG. 7C is a partially enlarged view. The specific example is a rotary type lifter. A plurality of bases 530 on which a tray is placed are rotated in one direction. The lifter has tray entrances in the upper and lower parts and can perform tray upward and downward carriage at the same time. The lifter has a tray discharging unit. The tray vertical direction carrying parts (lifters) 510 and 520 carry an empty tray and a tray onto which a mail is stacked.

Figure 8:
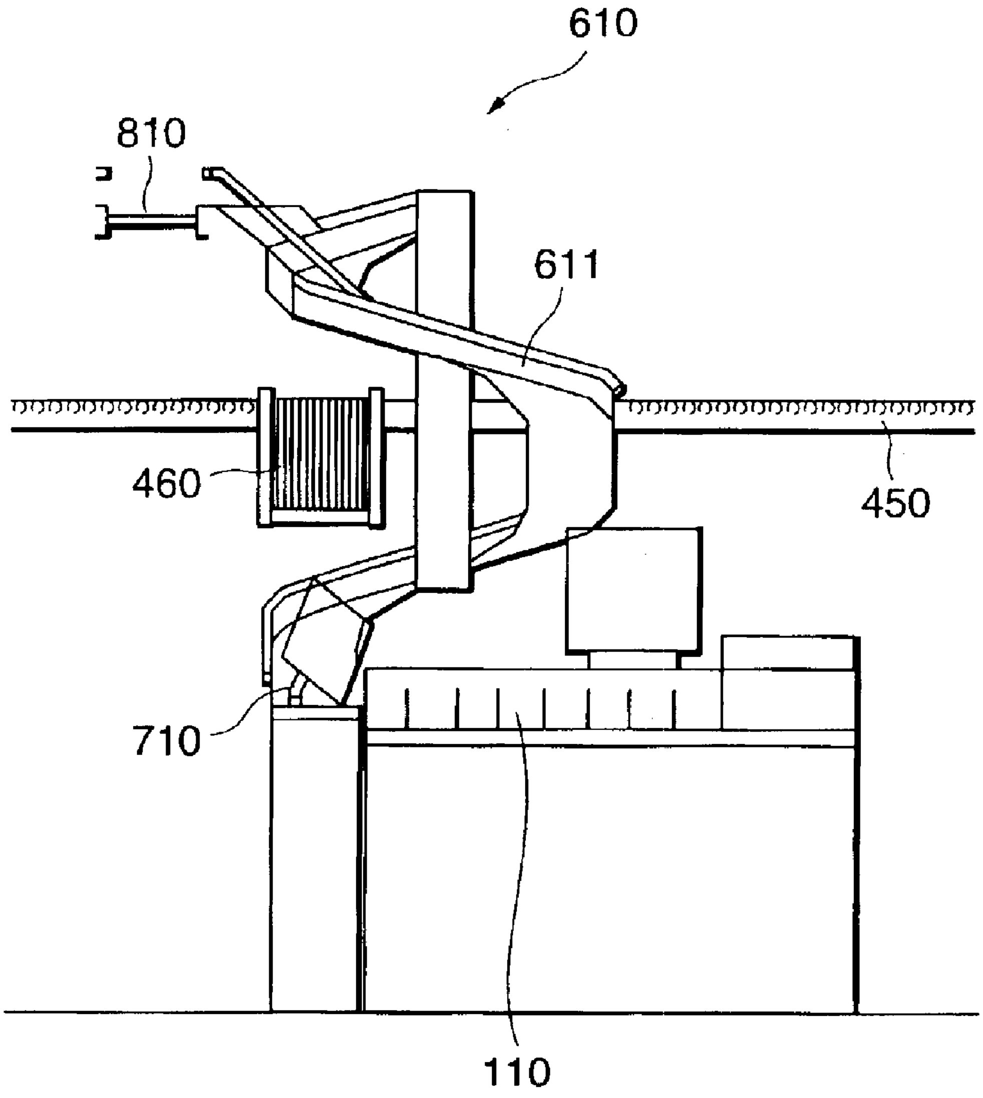
FIG. 8 is a cross-sectional view of a specific example of a second tray carrying unit.

Referring to FIG. 8, the second tray carrying unit has a spiral chute 611. The upper end of the spiral chute 611 is connected to the tray collecting unit 810. The lower end thereof is connected to the tray carrying-in unit 710. A tray including once-sorted mails is carried via the spiral chute 611 and the tray carrying-in unit 710 to the mail supplying unit 110. The mails are further sorted for each of the sorting bins. The empty tray collecting unit 460 collects the trays which have discharged the mails and sends them to the second empty tray carrying unit 450.

Figure 9:
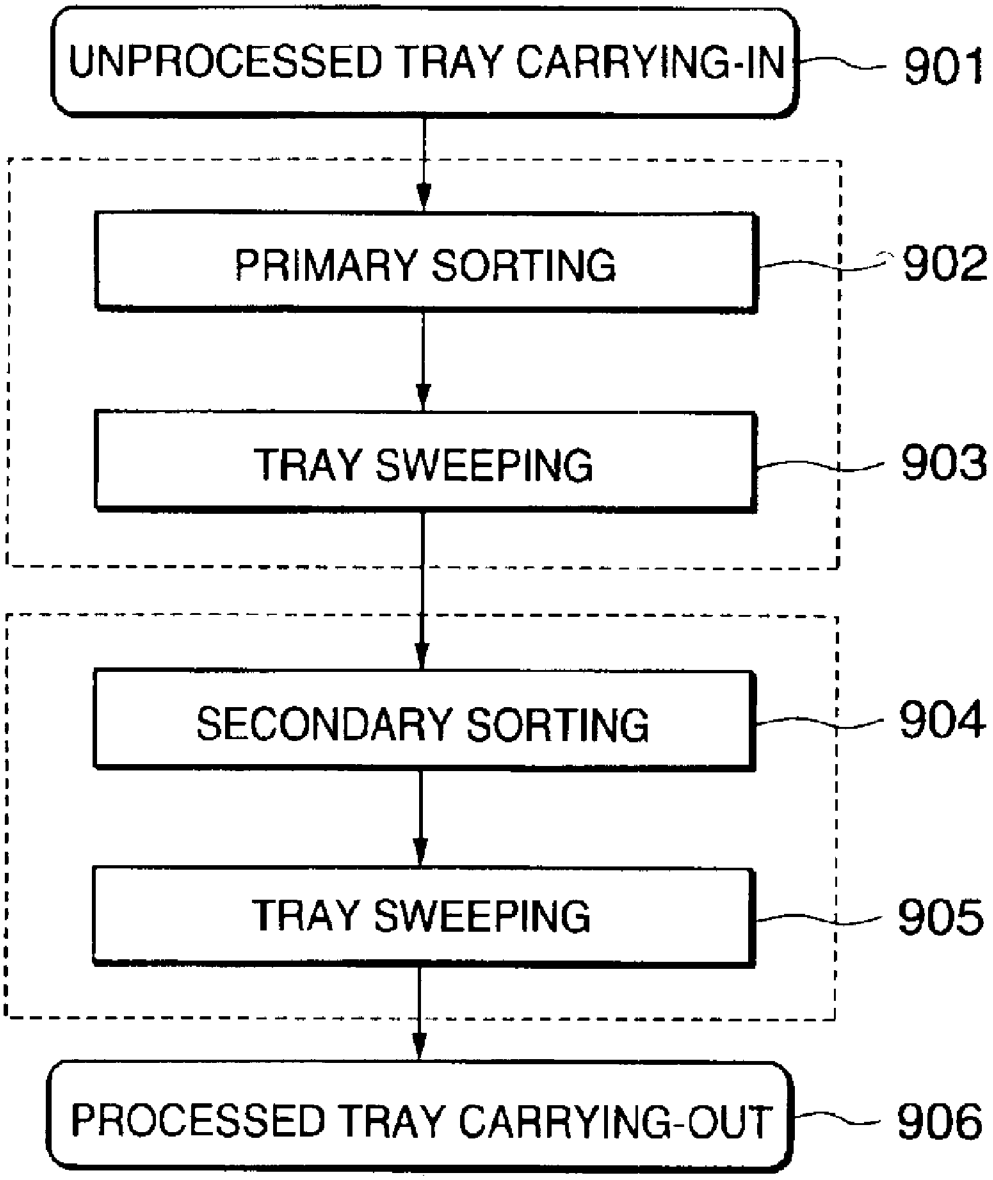
FIG. 9 is a flowchart showing an example of a mail sorting process.

Referring to FIG. 9, the basic operation of the mail sequencing system is shown. Unprocessed tray carrying-in 901 is performed. A primary sorting process 902 is executed. When mails sorted are all sorting stacked, an all trays discharging (tray sweeping) process 903 is executed. In this process, the sorting stacking unit discharges all the trays from the sorting bin to supply an empty tray. The tray is sent to the mail supplying unit again to execute a secondary sorting process 904. As described above, all the trays are discharged (or swept) from the sorting bin (905). The tray storage 300 collects the trays in the same sorting bin which are then carried out as processed trays (906).

As a specific example of the operation, the operation started from the mail supplying unit 110 will be described. The tray carrying-in unit 710 carries a tray onto which unprocessed non-standard-size mails and mails are stacked, near the mail supplying unit 110. The mail supplying unit 110 separates the mails and the mails one by one and reads information by a scanner and a bar code reader to throw them into the carrying box 290. The sorting bin in which the mails are stacked is decided based on the information. When the carrying box reaches the specified sorting bin of the sorting stacking unit, it opens its bottom surface to drop the mail onto the tray. The mail supplying unit 110 moves the empty tray to the empty tray collecting unit 460. The second empty tray carrying unit 450 carries the empty tray to the sorting stacking unit 210.

When the sensor provided in each of the sorting bins of the sorting stacking unit 210 senses a full tray, the tray moving unit 215 moves the tray to the conveyer part 250.

The conveyer part 250 carries the tray to the tray vertical direction carrying part 520. The tray is moved to the tray storage 300 and is stored into a predetermined storage unit by the side conveyer and the center conveyer. The sorting stacking unit 210 which has discharged the full tray moves the empty tray from the first empty tray carrying unit 410 to the empty sorting bin. The first empty tray carrying unit 410 supplies a new empty tray from the second empty tray carrying unit 450.

Figure 10A:
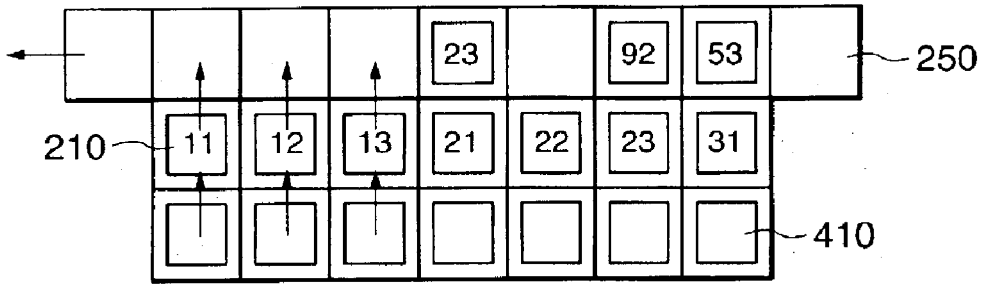
FIGS. 10A and 10B are plan views showing an example of a tray moving method in the sorting stacking unit.
Figure 10B:
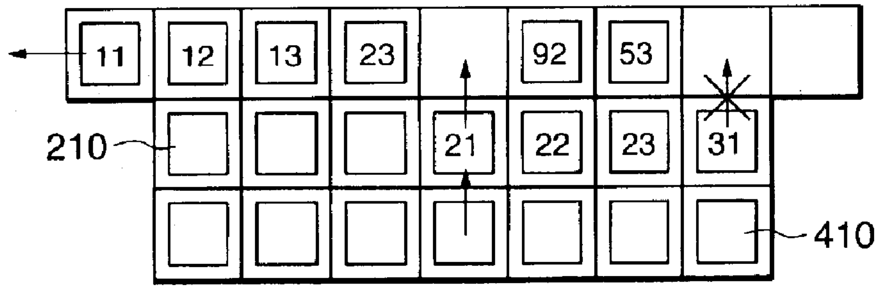

When a last package to be sorted in the primary sorting process is thrown onto the tray of the sorting bin, the trays in the sorting bin are all discharged. As shown in FIG. 10A, when a tray 23 is on the conveyer part 250, the conveyer part 250 is stopped to move trays 11, 12 and 13 before the tray 23 to the conveyer part 250. As shown in FIG. 10B, when the tray 23 is moved after the trays 11, 12 and 13, a tray 21 can be moved. The trays are all discharged from the sorting bin before the tray 21. At this time, a tray 31 is not moved. The trays 22 and 23 exist in the sorting bin before the tray 31. Upon passage of trays 92 and 53 on the conveyer part 250, the trays 22, 23 and 31 can be moved. In such method, discharging all the trays can be executed efficiently. An empty tray is supplied from the first empty tray carrying unit 410 to each of the sorting bins in the sorting stacking unit 210.

Figure 11:
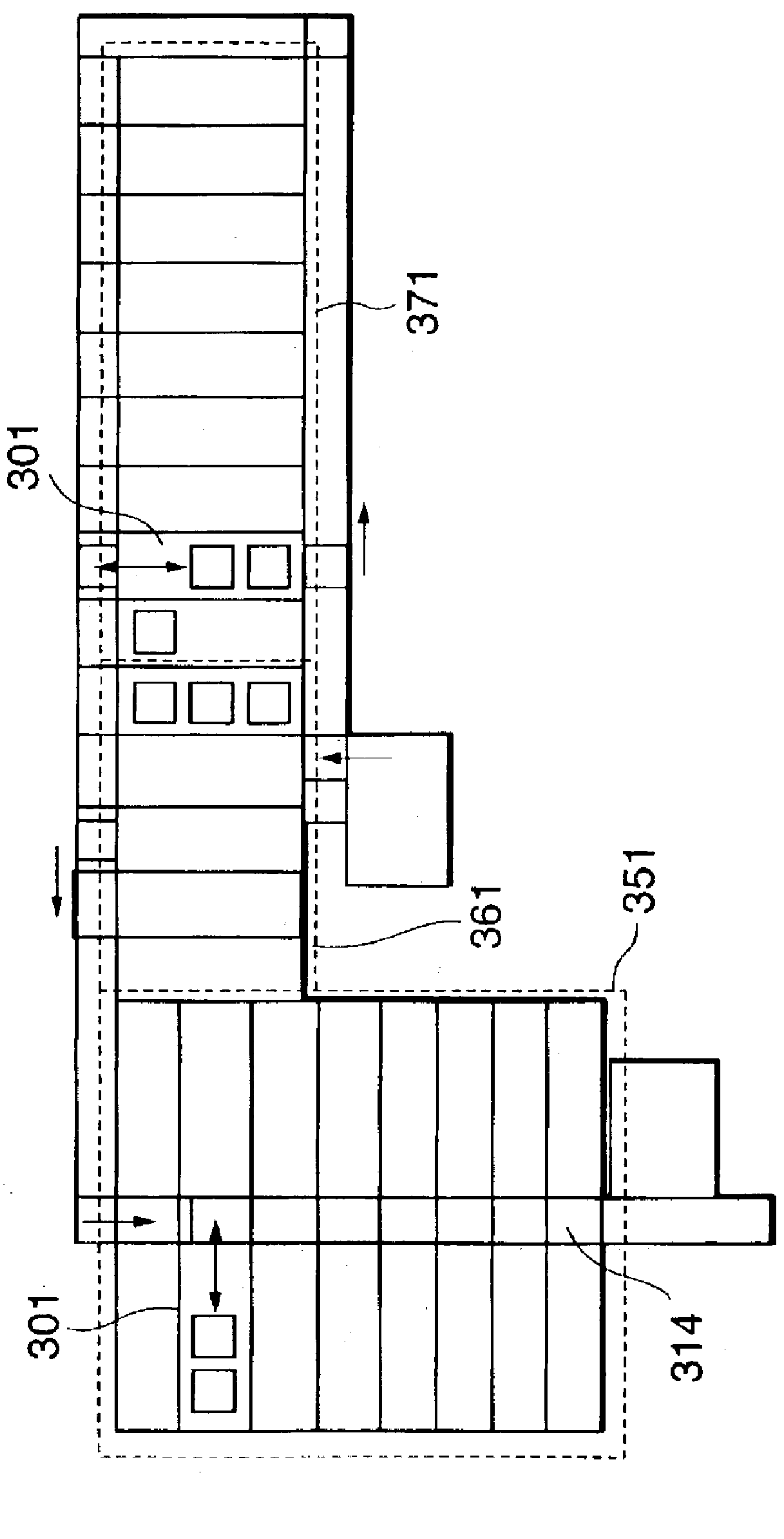
FIG. 11 is a plan view of a specific example of the tray storages corresponding to one mail supplying unit.

In the mail sequencing system, the mail supplying units 110, 120, 130 and 140 correspond to the sorting stacking units 210, 220, 230 and 240, respectively. The tray storage 300 is sectioned into four regions corresponding to the four sorting stacking units. FIG. 11 shows one region of the tray storage 300 corresponding to the sorting stacking unit 210. The region has three areas. These are a first full tray storage area 351, a second full tray storage area 361, and discharged all trays storage area 371. The first full tray storage area 351 stores a first full tray. The second full tray storage area 361 stores a second full tray or thereafter in the sorting bin. The discharged all trays storage area 371 stores trays moved from all the sorting bins to the conveyer part after a last mail sorted is stacked onto the tray of the sorting bin. When the volume of a storage unit 301 includes three trays, the sorting bins in the sorting stacking unit 210 for the three areas are grouped by three sections. Each of the groups and the storage unit 301 correspond with each other one-to-one. For example, the three sections sequentially from one end of the sorting stacking unit 210 form one group. One storage unit is allocated to each of the groups. The first full tray storage area 351 requires at least the number of the storage units 301 of ⅓ of the number of the sorting bins of the sorting stacking unit 210. FIG. 11 shows an example in which the storage units 301 in the number are arranged on both sides of the center conveyer 314. A full tray discharged from the sorting bin of the sorting stacking unit 210 is stored into the corresponding storage unit 301. The full tray occurring from the sorting bin of the same group is stored into the corresponding storage unit 301 in occurrence order. After the full tray is discharged from the sorting bin, the full tray discharged from the same sorting bin is stored into the second full tray storage area 361. The area size is increased or decreased depending on the number of the occurring full trays. When a second full tray occurs, the storage unit is allocated thereto in occurrence order. The number of the storage units below the number of the groups of the sorting bin can be prepared. When necessary, the number of the storage units of this area can be increased. When the sorting process is completed and all the trays are discharged from the sorting bin, the trays are stored into the tray storage area 371. The tray storage area 371 requires at least the number of the storage units 301 above the number of the groups of the sorting bin. As described above, when the primary sorting process 902 is executed, the tray storage 300 stores all the trays to arrange an empty tray in the sorting bin of the sorting stacking unit 210.

Figure 12A:
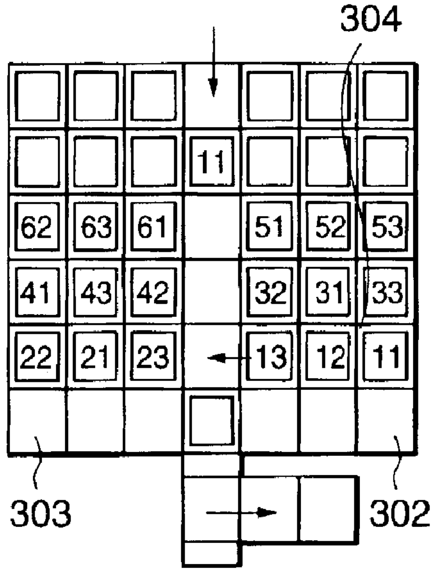
FIGS. 12A, 12B, 12C and 12D are plan views showing an example of a tray array in the tray storage.
Figure 12B:
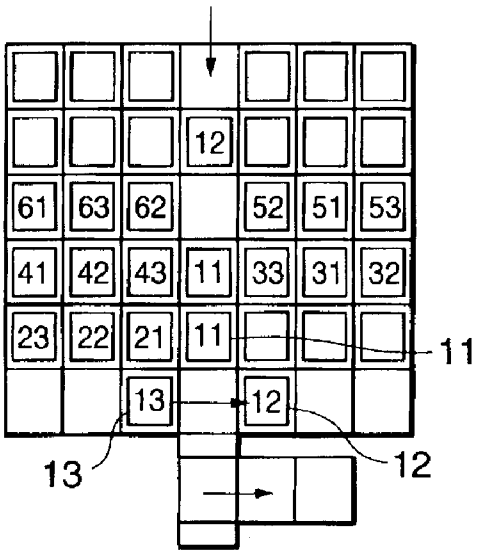
Figure 12C:
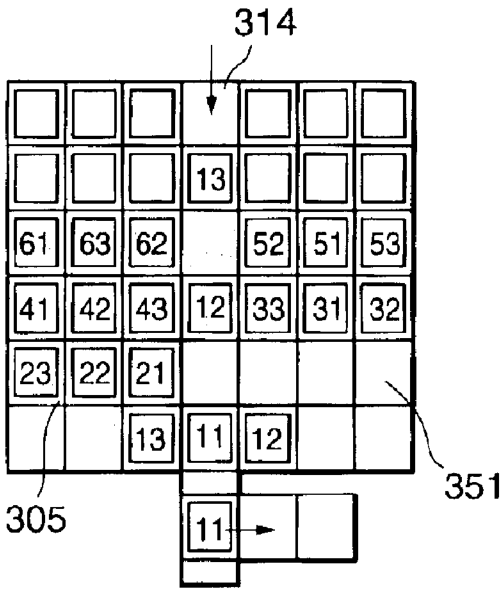
Figure 12D:
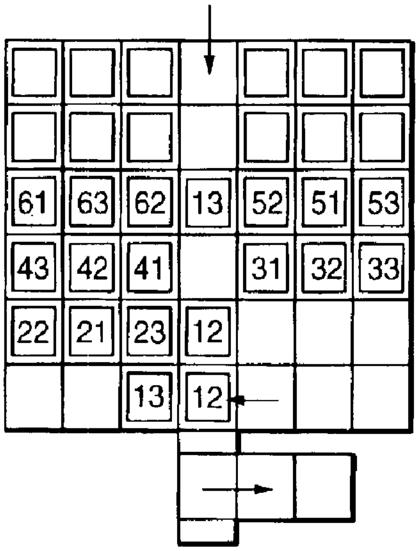

In the second sorting process, the tray stored into the tray storage 300 is supplied to the mail supplying unit 110 again. FIGS. 12A, 12B, 12C and 12D show an example of a tray array executed in the first full tray storage area 351 of the tray storage 300 before re-supplying. The tray number is an identification number of the sorting bin. The numerals 11, 12 and 13 denote the group of the sorting bin allocated to one storage unit. The full trays 13, 12 and 11 stored into the storage unit 304 are arrayed using work storages 302 and 303 into which the trays are not stored (FIG. 12A). As shown in FIG. 12B, the tray 12 is moved to the work storage 302 and the tray 13 is moved to the work storage 303. The tray 11 is moved onto the center conveyer 314. As shown in FIG. 12C, another tray 11 discharged from the same sorting bin and stored into another area on the tray storage 300 is moved by the center conveyer 314, and the two trays 11 are arranged adjacent to each other. The full tray 11 is carried by the spiral chute 611 to the mail supplying unit 110. As shown in FIG. 12D, the two trays 12 discharged from the next sorting bin are arranged adjacent to each other on the center conveyer 314. The tray 13 discharged from the sorting bin after next is moved by the center conveyer 314. When a full tray is discharged from the second full tray storage area 361, the full tray is moved ahead to the first full tray storage area 351. The second full tray storage area 361 also requires the work storages. The storage unit after discharging the tray can be used as the work storage.

According to the above method, the trays discharged from the sorting bin can be arrayed in full order and re-supplied to the mail supplying unit 110. The remaining trays 12 and 13 are processed in the same manner. The arraying process using the work storages is also executed in the second full tray storage area 361 and the discharged all trays storage area 371. The arrayed trays are carried by the center conveyer. The full tray also occurs in the secondary sorting process 904. Basically, the trays are stored into the three areas of the tray storage 300. The trays in a re-supplying standby still remain on the tray storage 300. The trays are moved sequentially to the empty storage unit of the first full tray storage area 351. As the primary sorting process 902 is advanced, the trays are moved to the original storage location. Such method can reduce any excess storage units.

When the secondary sorting process 904 is completed, all the trays are discharged from the sorting bin as in the primary sorting process 902. A processed tray discharging process 906 is executed. As described above, the trays are arrayed and the tray collecting unit 810 collects the trays. At this time, a new mail can be carried to the mail supplying unit. When unprocessed trays remain in the tray storage 300, the same process as the secondary sorting process 904 is performed.

The above operation is performed likewise to the mail supplying units 120, 130 and 140 and the sorting stacking units 220, 230 and 240 corresponding thereto. The above operation is executed by control of the control part of the mail sequencing system. The operation conditions can be changed by varying the programs or the input conditions to the control part. During the operation of the package sequencing system, when an empty tray is lacked, the empty tray can be supplied from the tray carrying-in unit 710. Mails that the mail sequencing system processes are preferably non-standard-size, thin type mails such as books.

In the mail sequencing system of the present invention, the tray storage is arranged on the top of the sorting stacking units and the mail supplying units. The carriage path length is short. The entire system is smaller. The entire processing speed is increased. The invention is applicable to flat parcels other than non-standard-size mails or flat mails.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A mail sequencing system, comprising:

a mail supplying unit for reading mail information;

a sorting unit comprising a plurality of sorting bins a tray supplying unit for supplying trays to said plurality of sorting bins;

a mail carrying unit for carrying mail from said mail supplying unit to a sorting bin of said plurality of sorting bins based on said mail information of the carried mail, and deposit the carried mail on a tray provided in the sorting bin;

a tray storage unit for storing trays, said tray storage unit being arranged at least partially on top of at least one of said sorting unit, said mail supplying unit and said mail carrying unit;

a first tray carrying unit for carrying the tray with deposited mail from the sorting unit to the tray storage unit; and a second tray carrying unit for carrying the tray with deposited mail from the tray storage unit to said mail supplying unit, wherein the mail deposited on the tray may be resupplied to said mail supplying unit.

2. The mail sequencing system according to claim 1, wherein said tray storage unit comprises:

conveyers for carrying the tray;

a plurality of storage units arranged adjacent to the conveyers which can store the tray; and a tray moving unit for moving the tray between said conveyers and each of the storage units.

3. The mail sequencing system according to claim 2, further comprising a control part, wherein when a space is formed in a storage unit of the tray storage, the control part can sequentially move a tray located in another part of the storage unit to the space.

4. The mail sequencing system according to claim 1, wherein said tray storage unit comprises:

a first storage area for storing a first full tray;

a second storage area for storing a second full tray; and a third tray storage area for storing trays moved from the sorting bins after a predetermined number of mails have been processed by said mail supplying unit and said mail carrying unit.

5. The mail sequencing system according to claim 1, wherein said tray storage unit comprises a work storage area for arraying trays.

6. The mail sequencing system according to claim 4, wherein said work storage area is used for arraying trays with mail from the same sorting bin together.

7. The mail sequencing system according to claim 1, further comprising a carrying box for holding mail;

wherein said mail supplying unit puts mails into said carrying box, and said mail carrying unit carries the carrying box.

8. The mail sequencing system according to claim 1, wherein the tray supplying unit comprises a tray collecting unit that collects trays which have resupplied mail to the mail supplying unit.

9. The mail sequencing system according to claim 7, wherein the tray supplying unit comprises a tray moving unit for moving one of the collected trays to one of the plurality of sorting bins.

10. The mail sequencing system according to claim 1, further comprising a tray moving unit which can move the trays supplied by the tray supplying unit to the plurality of sorting bins.

11. The mail sequencing system according to claim 1, wherein a plurality of sequencing systems are arrange integrally.

12. The mail sequencing system according to claim 1, wherein the first tray carrying unit comprises a vertical direction carrying part for carrying the tray in the vertical direction and a conveyer part for carrying the tray from the sorting bin of the sorting unit to the vertical direction carrying part.

13. The mail sequencing system according to claim 1, further comprising a tray carrying-in unit for carrying-in a tray including unprocessed mail to the mail supplying unit.

14. The mail sequencing system according to claim 1, wherein after the last mail of a predetermined number of mails to be sorted is deposited onto one of the trays in the sorting bins, the first tray carrying unit carries the trays to the tray storage unit.

15. The mail sequencing system according to claim 1, wherein mail that is resupplied to the mail supplying unit is processed by said mail supplying unit and said mail carrying unit again, and the tray that carried the deposited mail back to the mail supplying unit is collected by a tray collecting unit.

16. A mail sequencing system, comprising:

a mail supplying unit for receiving mail and reading mail information;

a sorting unit comprising a plurality of sorting bins;

a tray disposed in each of said sorting bins;

a mail carrying unit for carrying mail from said mail supplying unit to one of said plurality of sorting bins and for depositing the mail on the tray in said one of said plurality of sorting bins, said one of said plurality of sorting bins being selected based on the mail information of the mail in the carrying unit;

a tray storage unit for storing trays, said tray storage unit being arranged at least partially on top of at least one of said sorting unit, said mail supplying unit and said mail carrying unit;

wherein the tray carrying mail deposited on said tray by said mail carrying unit is moved from said sorting bin to said tray storage unit by a first tray carrying unit, said tray carrying said mail is moved from said tray storage unit to said mail supplying unit by a second tray carrying unit, and wherein said mail carried by said tray is resupplied to said mail supplying unit.

17. The mail sequencing system of claim 16, further comprising a tray carrying-in unit for carrying-in a tray including unprocessed mail to the mail supplying unit.

18. The mail sequencing system of claim 16, further comprising a tray supplying unit for supplying trays each of said plurality of sorting bins.

19. The mail sequencing system according to claim 16, wherein said tray storage unit comprises:

conveyers for carrying the tray;

a plurality of storage units arranged adjacent to the conveyers which can store the tray; and a tray moving unit for moving the tray between said conveyers and each or the storage units.

20. The mail sequencing system of claim 19, wherein trays carrying mail are arranged in said tray storage unit according to the sorting bin in which the mail was deposited on the trays.

* * * * *